United States Patent [19]
Kitaue

[11] Patent Number: 5,100,214
[45] Date of Patent: Mar. 31, 1992

[54] HOUSING FOR HAND-HELD VIDEO DISPLAY DEVICE

[75] Inventor: Kazumi Kitaue, Kobeshi, Japan

[73] Assignee: Konami Industry Co., Ltd., Kobe, Japan

[21] Appl. No.: 666,231

[22] Filed: Mar. 8, 1991

Related U.S. Application Data

[63] Continuation of Ser. No. 346,170, May 1, 1989.

[51] Int. Cl.⁵ .............................................. A47B 81/00
[52] U.S. Cl. .................................... 312/223; 312/7.2; 312/239
[58] Field of Search ............... 108/43; 248/118.5; 224/222, 267; 273/148 B; 312/237, 7.2, 223

[56] References Cited

U.S. PATENT DOCUMENTS

| | | | |
|---|---|---|---|
| 2,126,051 | 8/1938 | Sievers | 108/43 |
| 2,701,173 | 2/1955 | Senior et al. | 224/267 X |
| 3,125,825 | 3/1964 | Gaudette | 108/43 |
| 3,407,757 | 10/1968 | Warner | 108/43 |
| 4,052,944 | 10/1977 | Jennings | 108/43 |

*Primary Examiner*—Joseph Falk

[57] ABSTRACT

A compact generally rectangular slim profile housing for a hand-held video display device or apparatus wherein the housing has front and back housing portions adapted for interfitting relation along marginal peripheral edges, and wherein the back housing portion has a concave surface enabling the housing to be nested or cradled on the user's thigh when in a sitting position so as to assist in stabilizing the video device without inhibiting manipulation of the controls and visual observation of a video screen exposed through the front housing portion.

9 Claims, 4 Drawing Sheets

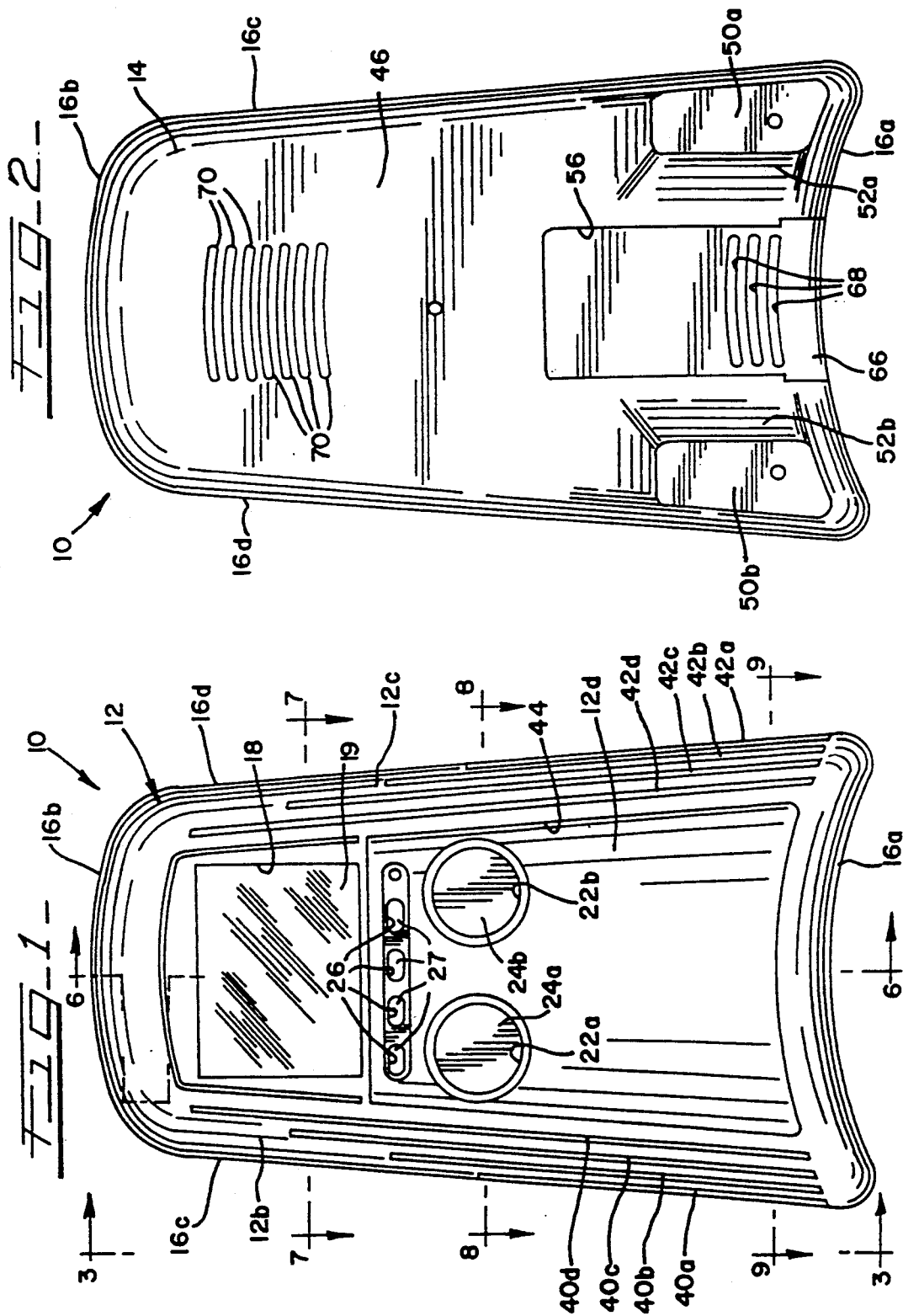

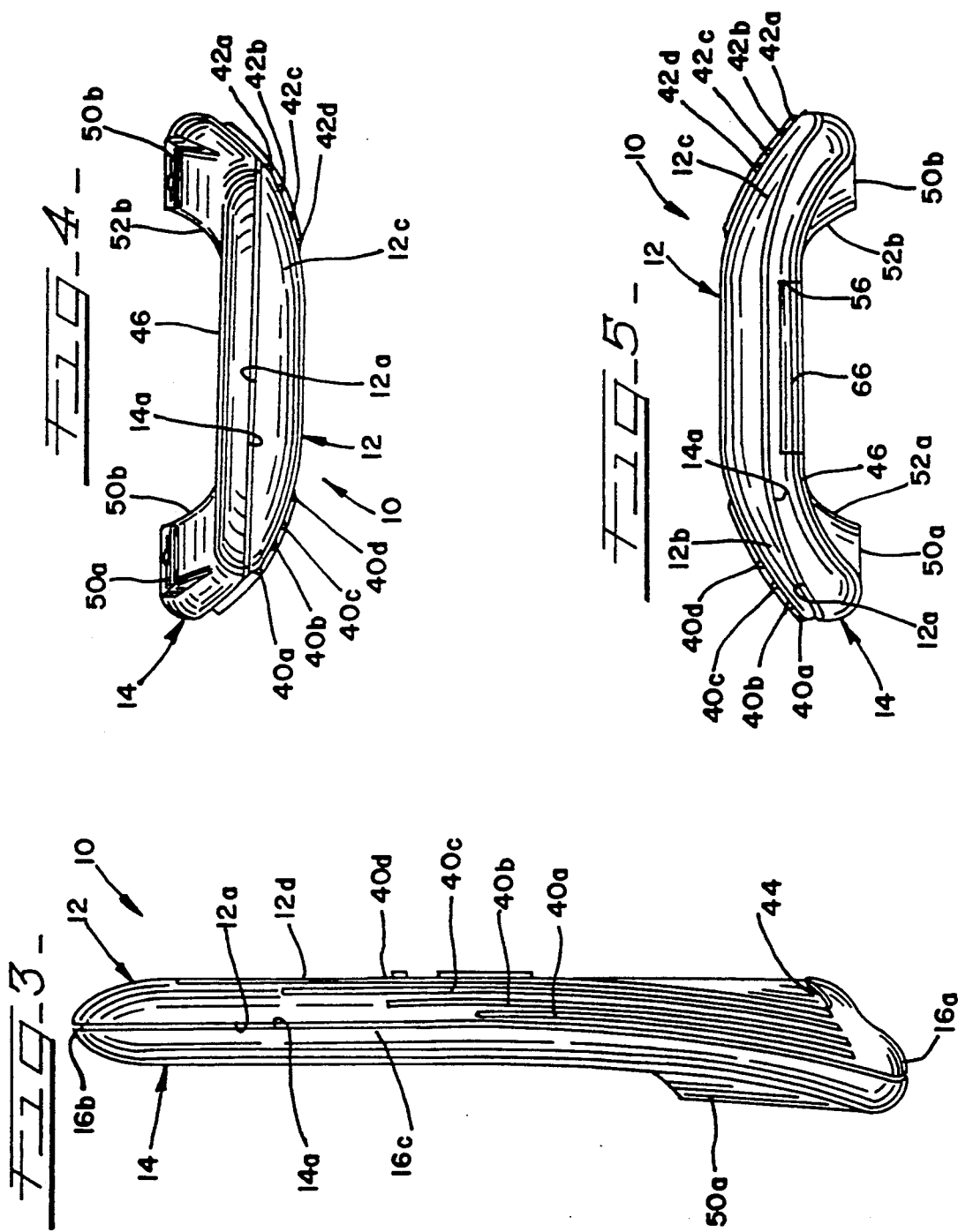

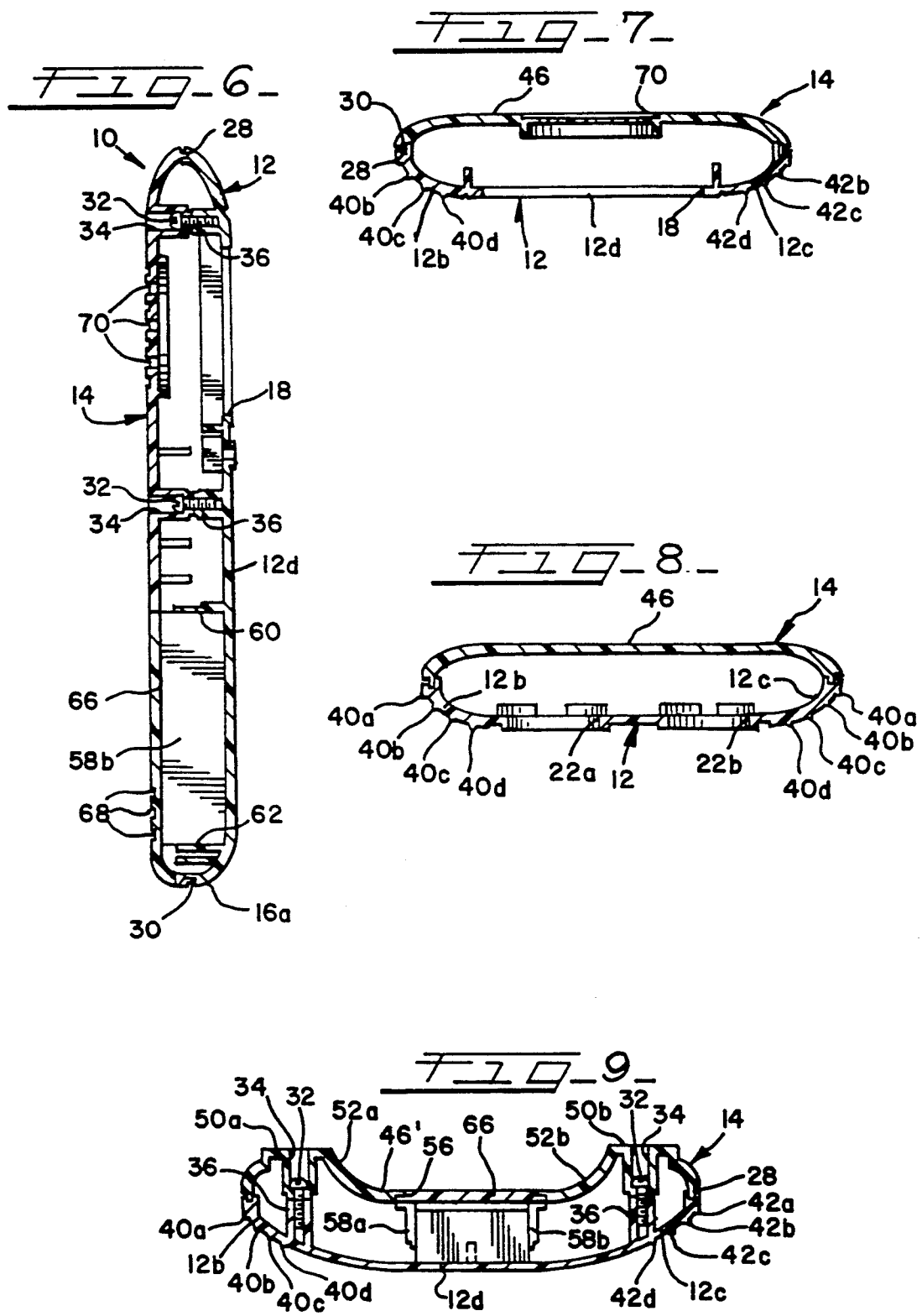

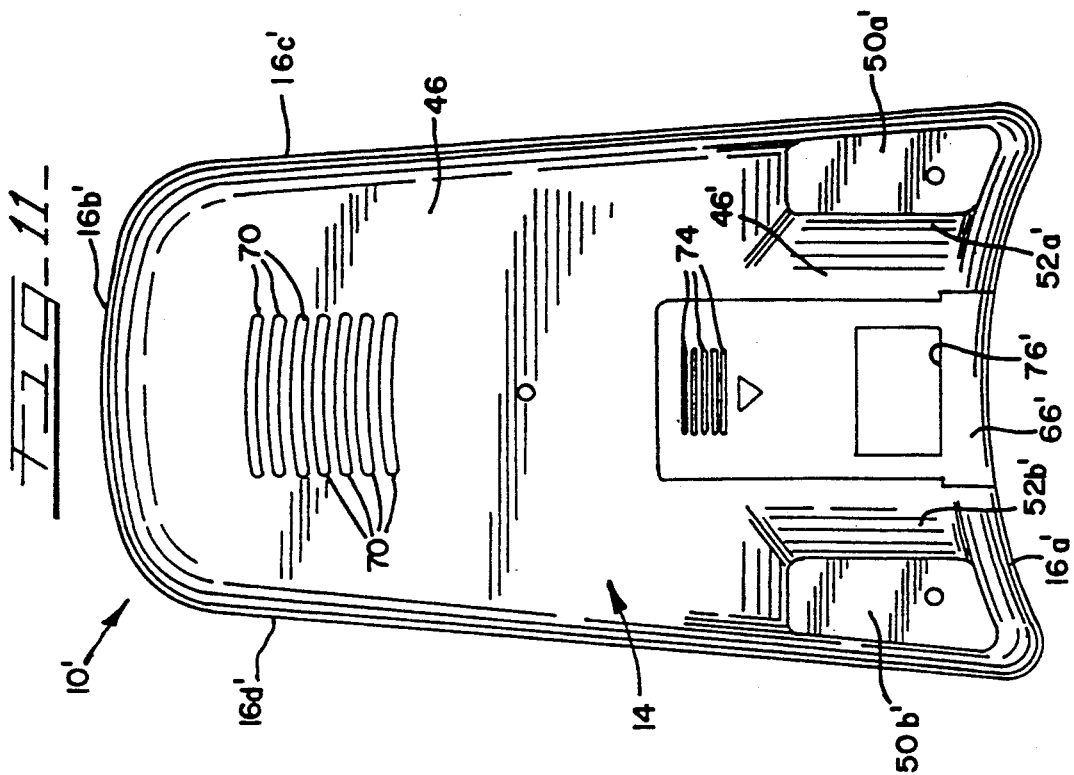
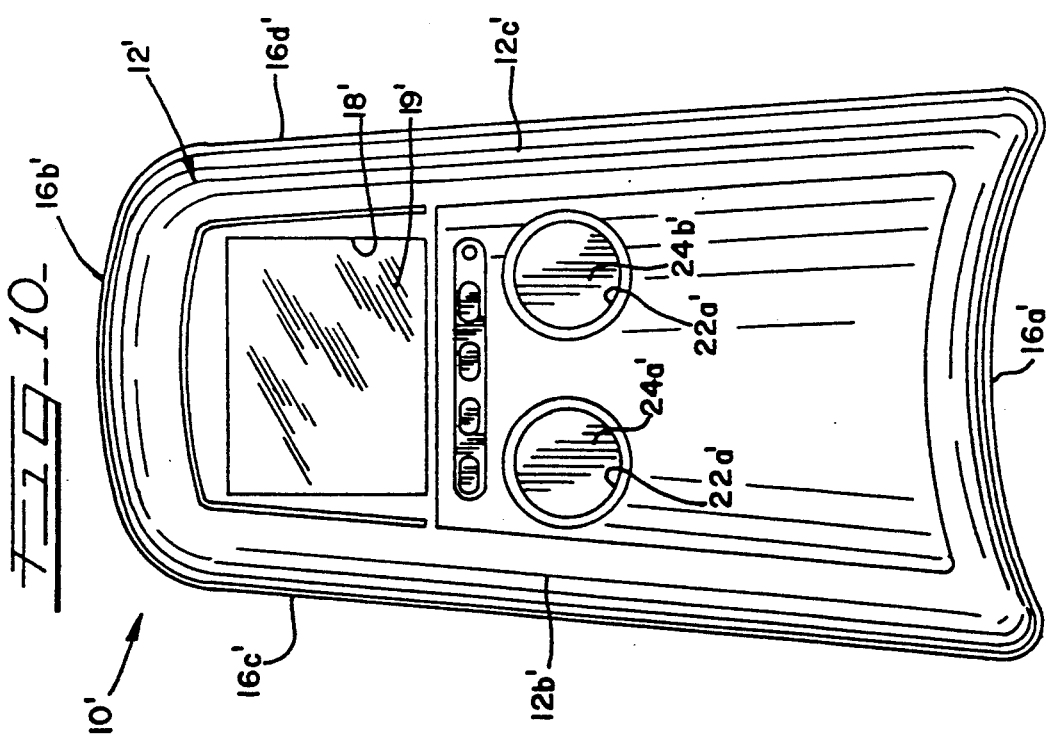

HOUSING FOR HAND-HELD VIDEO DISPLAY DEVICE

This is a continuation of application Ser. No. 07/346,170, filed May 1, 1989.

BACKGROUND OF THE INVENTION

The present invention relates generally to video display devices, and more particularly to a novel housing for use with a hand-held video display device or apparatus.

The advent of video display devices or apparatus as employed in video games and the like has led to the development of hand-held video display devices which enable the operator to hold the video device in one hand while manipulating control buttons and the like with the other hand and observing a video display screen. Depending upon the size and weight of the video display device, such hand holding of the device may cause arm and/or hand fatigue. To alleviate the problem, hand-held video display devices have generally employed relatively thin side profile housings or outer shells having substantially greater longitudinal length and transverse width than depth. The housings have substantially flat rear surfaces which facilitate placement on a table top or the like so that the upwardly facing surface exposes the controls and video screen during operation. While video display devices having such thin profiles assist in relieving the problem of arm and/or hand fatigue by enabling placement on a flat surface during operation, they do not lend themselves to stable positioning when the operator is in a sitting position and holding the video display device on his/her lap while manipulating the controls and viewing the video display screen. Accordingly, a hand-held video display device having an improved housing design which significantly improves stability when holding the video device on the operator's lap would greatly improve ease of operation, and particularly viewing of the video display screen while manipulating the various controls.

SUMMARY OF THE INVENTION

One of the primary objects of the present invention is to provide a novel compact contemporary style housing for a hand-held video display device which significantly enhances the ease of holding the device in a stable position during operation.

A more particular object of the present invention is to provide a novel compact housing for a hand-held video display device or apparatus wherein the housing has front and back housing portions adapted for mating relation along mutually facing peripheral edges, and wherein the back or rear housing portion has a substantially concave surface enabling the housing to be readily nested or cradled on the users thigh when in a sitting position so as to assist in stabilizing the video device without inhibiting manipulation of the controls and visual observation of a video screen exposed through the front housing portion.

Another object of the present invention is to provide a novel housing for a hand-held video display device or apparatus as aforedescribed wherein the front housing portion may have longitudinally extending outwardly projecting ribs formed adjacent its lateral edges to facilitate improved hand gripping of the device during operation.

Further objects, advantages and features of the invention will become apparent from the following detailed description taken in conjunction with the accompanying drawings wherein like reference numerals designate like elements throughout the several views.

BRIEF DESCRIPTION OF THE DRAWINGS

FIG. 1 is a front elevational view of a housing for a hand-held video display device or apparatus constructed in accordance with the present invention;

FIG. 2 is a rear elevational view of the video display device housing illustrated in FIG. 1;

FIG. 3 is a side elevational view of the video display device housing of FIG. 1 taken substantially along line 3—3 of FIG. 1;

FIG. 4 is a top plan view of the video display device housing of FIG. 1;

FIG. 5 is a bottom view of the video display device housing of FIG. 1;

FIG. 6 is a vertical sectional view taken substantially along line 6—6 of FIG. 1, looking in the direction of the arrows;

FIG. 7 is a transverse sectional view taken substantially along line 7—7 of FIG. 1;

FIG. 8 is a transverse sectional view taken substantially along line 8—8 of FIG. 1;

FIG. 9 is a transverse sectional view taken substantially along line 9—9 of FIG. 1;

FIG. 10 is a front elevational view of an alternative embodiment of a housing for a hand-held video display device in accordance with the invention; and FIG. 11 is a rear elevational view of the housing of FIG. 10.

DETAILED DESCRIPTION

Referring now to the drawings, and in particular to FIGS. 1-5, a housing for a hand-held video display device or apparatus constructed in accordance with one embodiment of the present invention is indicated generally at 10. The video display device housing 10 is of compact contemporary design and is sized and configured to receive and support internal circuitry, such as for a video game or other video display circuitry (not shown), and facilitates holding in an operator's hand while manipulating controls for the associated video display circuitry with the operator's other hand. The housing 10 includes a front housing portion 12 and a back or rear housing portion 14 which have outer peripheral edges 12a and 14a, respectively, (FIG. 3) adapted for mutual interengaging relation when the front and back housing portions are secured in assembled relation to each other so as to establish a shell-like housing having an internal chamber for receiving circuitry and the like. Preferably the peripheral edges of the front and back housing portions are configured to establish an outwardly facing peripheral groove when in assembled relation, as shown in FIG. 3.

The housing 10 has a generally trapezoidal configuration, when considered in front elevation in FIG. 1, defined by a lower or bottom peripheral edge surface 16a formed as a concave arcuate edge surface, an upper or top edge surface 16b formed as a convex arcuate surface, and generally longitudinal rectilinear lateral edge surfaces 16c and 16d. The laterally opposite ends or corners of the bottom and top arcuate edge surfaces 16a and 16b, respectively, blend with the lateral edge surfaces 16c and 16d through curved or rounded corner edge surfaces.

The front housing portion 12 has a generally rectangular opening 18 behind which may be mounted a video display such as an LCD screen of conventional design having a display screen 19 visually observable in the opening 18. In the illustrated embodiment, the front housing portion 12 also has a pair of circular openings 22a and 22b (FIG. 1) within which may be supported control knobs or buttons 24a and 24b, respectively, forming part of the video display control circuitry and which are manually manipulatable in a known manner. The circular openings 22a and 22b may be of equal diameter and are symmetrical about the longitudinal centerline of the front housing. A plurality of generally equal size oblong openings 26 may also be formed in the front housing portion 14 such that their major axes lie on a common line transverse to the longitudinal axis of the housing 10. The oblong openings 26 may receive pushbutton type controls 27 which, together with the control knobs or buttons 24a and 24b, facilitate selective control of the internal circuitry for the associated video game, calculator or other electronic device employed with the housing 10.

The peripheral marginal edge 12a of the front housing portion 12 is formed with a continuous channel or groove 28 of substantially U-shaped transverse cross-section configured to snugly receive a continuous rib or flange 30 formed along the peripheral marginal edge 14a of the back housing portion 14. The groove 28 and rib 30 mutually interfit with each other when the front and back housing portions 12 and 14 are secured together as hereinafter described.

The front and back housing portions 12 and 14 are preferably formed of a suitable rigid plastic material, and are maintained in releasible assembled relation through a plurality of screws 32 insertable within cylindrical recesses or bores 34 formed in the back housing portion generally at its geometrical center and adjacent the upper and lower corners such that the threaded shanks of the screws have threaded engagement with aligned mounting bosses 36 formed on the inner surface of the front housing portion, as illustrated in FIGS. 6 and 9.

The laterally opposite longitudinal side edge walls of the front housing portion 12 curve convexly forwardly from their corresponding marginal edge 12a, as indicated at 12b and 12c in FIGS. 7-9, so as to merge with a longitudinal central surface area 12d which forms a generally flat forwardly facing surface of the housing 10. To improve hand gripping of the housing 10, a plurality of generally longitudinally extending outwardly projecting ribs 40a–d and 42a–d may be formed on the outer surfaces of the curved side walls 12b and 12c, respectively, of the front housing portion 12, the ribs on each side being parallel to each other. In this manner, the operator's thumb and fingers may curl about the opposite lateral edges of the housing and engage the corresponding ribs to provide better gripping. The outer frontal surface 12d of the front housing 12 is preferably slightly recessed within a generally trapezoidal shaped area, as indicated as 44 in FIG. 1, to provide a defined area within which the circular control knob openings 22a and 22b and the elongated control button openings 26 are formed.

In accordance with one feature of the video display housing 10, an outwardly or rearwardly facing surface 46 of the back housing portion 14 is formed with an inwardly recessed concave curvature 46a which extends from the bottom edge 16a upwardly along approximately one-fourth the longitudinal length of the back housing. As illustrated in FIGS. 4 and 5, the concave curvature of the rear housing surface 46 is preferably of a configuration which facilitates placement of the housing 10 on an operator's thigh when in a sitting position so as to stabilize the housing and corresponding video display device during operation. In this manner, the video display housing cradles or nests against the operator's thigh when not being operated in a wholly hand-held mode, and thereby enables prolonged operation without causing hand or arm fatigue.

The concave surface 46a on the back housing portion 14 is disposed between and defined in part by a pair of outwardly projecting support pads or bosses 50a and 50b formed on the back housing portion 14 adjacent the laterally opposite lower corners. The support pads 50a and 50b have mutually facing curved surfaces 52a and 52b, respectively, which are of an arcuate concave curvature and define the lateral boundaries of the concave surface 46a of the back housing portion 14 to better facilitate cradling or nesting of the video housing against an operator's thigh when operated in a lap position. The support pads 50a and 50b also define coplanar support pad surfaces which facilitate placement of the video display apparatus on a flat surface, such as a table top or the like.

In the embodiment illustrated in FIG. 1 and 2, the back housing portion 14 has a rectangular opening 56 formed adjacent the lower concave end 16a as seen in FIGS. 2 and 9. A pair of inwardly directed parallel walls 58a and 58b are formed along the longitudinal edges of the rectangular opening 56 and cooperate with generally inwardly directed upper and lower transverse walls 60 and 62, respectively, formed on the inner surface of the front housing portion 12 (FIG. 6) to establish an internal battery receiving chamber or compartment for receiving batteries to power a video control circuit or the like when mounted within the housing 10. The longitudinal edges of the opening 56 are preferably grooved to cooperate with complimentary ribs or flanges formed on the longitudinal edges of a rectangular cover member 66 so as to enable sliding movement of the cover member and removal for inserting batteries into the battery compartment. Preferably, the cover member 66 has a plurality of transverse shallow grooves 68 formed in its outer surface to facilitate gripping and movement of the cover member.

The back housing portion 14 of housing 10 is also formed with a plurality of generally transverse elongated openings 70 generally adjacent the upper end and behind which a speaker may be mounted to provide audible sounds produced by the video display circuitry when mounted within the housing.

As aforementioned, the housing 10 is of a size sufficient to enable an operator to hold the housing within one hand with the fingers and thumb of the hand generally curled about the lateral edges of the housing, while manipulating controls for an associated video display with the other hand without inhibiting viewing of a video display screen viewed from the front of the housing. Gripping of the housing is enhanced by the longitudinal ribs 40a–d and 42a–d provided along the convex curved edge surfaces 12b and 12c of the front housing portion 12. The concave curvature of the back housing portion 14 facilitates prolonged operation of the video display device without hand or arm fatigue by enabling the housing to be nested or cradled against the operator's thigh when in a sitting position, thereby stabilizing the housing while manipulating the various controls. The lower concave marginal edge surface 16a of the housing 10 also facilitates nesting or resting of the housing against the operator's thigh when in a sitting position and holding the housing in a generally upright position.

FIGS. 10 and 11 illustrate an alternative embodiment of a housing, indicated generally at 10', in accordance with the invention for use with a hand-held video display device. The housing 10' is similar to the aforedescribed housing 10, and primed reference numerals applied to FIGS. 10 and 11 represent substantially identical structural features as represented by the non-primed corresponding reference numerals employed to describe the embodiment of FIGS. 1–5. In this respect, the housing 10' includes a front housing portion 12' and a rear or back housing portion 14' which have mutually cooperable outer peripheral edges adapted for interengaging relation to facilitate assembly into a compact contemporary housing design sized and configured to receive and support internal circuitry and enable holding in an operator's hand while manipulating controls 24'a, b and 27' for a video display 19'.

The housing 10' differs from housing 10 in that the front housing portion 12' is formed with laterally opposite longitudinal side edge walls 12'b and 12'c which curve convexly forwardly from the corresponding marginal peripheral edge and define smooth convex external surfaces without longitudinal externally projecting ribs as employed on housing 10.

The housing 10' also employs a slightly different style battery compartment cover 66' which has a plurality of externally projecting transverse ribs 74 formed generally adjacent the upper end of the cover to provide improved gripping for downward sliding and removal of the cover. A hook-like element (not shown) may be formed at the upper end of the cover 66' for releasible locking cooperation with a detent internally of the housing to prevent inadvertent release of the cover from housing 10'. The hook/detent may be formed to require inward depressing of the upper end of cover 66', such as at the ribs 74, to release the cover for removal. A rectangular recessed area 76 may be formed on the cover 66' to facilitate placement of instructions or other indicia.

While preferred embodiments of the invention has been illustrated and described, it will be understood that changes and modifications may be made therein without departing from the invention in its broader aspects. Various features of the invention are defined in the following claims.

I claim:

1. A hand-held video display housing comprising front and back housing portions defining a generally rectangular relatively slim profile housing having an internal chamber and a longitudinal axis and enabling an operator to hold the housing in one hand, said front housing portion having an opening enabling external viewing of a video display screen or the like, said back housing portion having a concave surface curved about an axis of curvature extending substantially parallel to said longitudinal axis and formed generally centrally between longitudinal edges thereof to enable the housing to be cradled on one leg of an operator when in a sitting position so as to assist in stabilizing the video display device with said opening exposed upwardly during operation, said front and back housing portions having laterally opposite longitudinal edge surfaces defined by convexly curved surfaces enabling the operator's fingers and thumb to extend about the convexly curved longitudinal edge surfaces to enhance gripping of the housing when operating the display device in a hand-held mode.

2. The housing as defined in claim 1 wherein the front and back housing portions are adapted for mating relation along interfitting peripheral marginal edges.

3. A housing for a hand-held video display device, said housing comprising front and back housing portions defining a generally rectangular relatively slim profile housing having a longitudinal axis and enabling an operator to hold the housing in one hand, said back housing portion having a concave surface curved about an axis of curvature extending substantially parallel to said longitudinal axis and formed generally centrally between longitudinal edges thereof to enable the housing to be cradled on one leg of an operator when in a sitting position so as to assist in stabilizing the video display device during operation, said front housing having laterally opposite longitudinal edge surfaces defined by convexly curved surfaces having outwardly extending generally longitudinal ribs thereon to enhance gripping of the housing within an operator's hand.

4. The housing as defined in claim 1 wherein the housing has a preferred orientation during operation so as to establish a lower marginal edge, said lower marginal edge having a concave curved edge surface facilitating resting of the curved edge surface of the housing on an operator's thigh when in a sitting position and with said housing in a generally upright position.

5. The housing as defined in claim 3 wherein said concave surface extends from a lower marginal edge of said housing longitudinal along the back housing portion.

6. The housing as defined in claim 5 including a pair of support pads formed on the back housing portion adjacent lower laterally opposite corners thereof, said support pads defining substantially coplanar surfaces which facilitate stabilized placement of the housing on a flat support surface.

7. The housing as defined in claim 1 wherein the front housing portion has a plurality of openings facilitating access to controls for a video display circuit when supported within the housing.

8. The housing as defined in claim 6 wherein said support pads have concave curved surfaces defining the lateral limits of said concave surface of said back housing portion.

9. A compact hand-held video display housing having a substantially rectangular slim profile, said housing comprising front and back housing portions affixed in interfitting assembled relation along marginal peripheral edges and defining an internal chamber, said front housing portion having an opening for accommodating a video display screen and at least one opening for receiving video control means, and said back housing portion having a concave external surface extending longitudinally of said back housing portion and formed centrally between longitudinal marginal edges thereof for enabling the housing to be nested on one thigh of the user when in a sitting position so as to assist in stabilizing the video device without inhibiting manipulation of controls and visual observation of a video screen exposed through the front housing portion.

* * * * *